United States Patent [19]

Amano et al.

[11] Patent Number: 5,282,680

[45] Date of Patent: Feb. 1, 1994

[54] APPARATUS FOR CONTINUOUS POLYMERIZATION

[75] Inventors: Tadashi Amano, Kamisu, Japan; Shuji Ohnishi, Lake Jackson, Tex.; Minoru Shigemitsu; Yasuhiro Takahashi, both of Kamisu, Japan; Hajime Kitamura, Ichihara, Japan

[73] Assignee: Shin-Etsu Chemical Co., Ltd., Tokyo, Japan

[21] Appl. No.: 63,604

[22] Filed: May 19, 1993

[30] Foreign Application Priority Data

May 19, 1992 [JP] Japan .................................. 4-151499

[51] Int. Cl.⁵ .............................................. B01F 15/02
[52] U.S. Cl. ..................................... 366/69; 366/266; 425/382.3
[58] Field of Search .................... 360/69, 76, 79, 88, 360/89, 90, 262, 263, 266, 270, 150, 154, 155, 156, 176, 177; 425/382.3, 205; 416/176; 415/203, 206

[56] References Cited

U.S. PATENT DOCUMENTS

| | | | |
|---|---|---|---|
| 3,771,900 | 11/1973 | Baehr | 416/176 |
| 3,827,888 | 8/1974 | Terwilleger | 366/156 |
| 4,080,096 | 3/1978 | Dawson | 416/176 |
| 5,174,651 | 12/1992 | Gaddis | 366/177 |

Primary Examiner—Robert W. Jenkins
Attorney, Agent, or Firm—Oblon, Spivak, McClelland, Maier & Neustadt

[57] ABSTRACT

An apparatus for continuous polymerization of vinyl chloride or a vinyl chloride-based monomeric mixture, comprising a pre-mixer 1 for preparing an aqueous suspension of the vinyl chloride or vinyl chloride-based monomeric mixture, and a polymer slurry tank 5 connected to the pre-mixer 1 through a polymerization passage comprising a piping 3, wherein a pump comprising a conical hub and an impeller mounted thereon comprised of a single spiral blade is used for drawing out the aqueous suspension from the pre-mixer into the polymerization passage and for discharging a polymer slurry formed in the passage into the slurry tank, and the polymerization passage has a length sufficient for permitting the vinyl chloride or vinyl chloride-based monomeric mixture contained in the aqueous suspension flowing through the passage to be polymerized to a predetermined extent while passing through the passage. The use of the pump having the structure as above ensures a marked suppression of polymer scale deposition in the pump, heat exchanger and pipings, and makes it possible to produce a resin with few fish-eyes. The apparatus is of extremely high industrial value for carrying out continuous polymerization.

3 Claims, 3 Drawing Sheets

APPARATUS FOR CONTINUOUS POLYMERIZATION

BACKGROUND OF THE INVENTION

1. Field of the Invention

The present invention relates to an apparatus for continuous polymerization for producing a vinyl chloride homopolymer or a vinyl chloride-based copolymer (hereinafter generically referred to as "vinyl chloride-based polymer") by suspension polymerization of vinyl chloride or a vinyl chloride-based monomeric mixture (hereinafter generically referred to as "vinyl chloride-based monomeric material").

2. Description of the Prior Art

Heretofore, suspension polymerization of a vinyl chloride-based monomeric material has been carried out by a batch polymerization process in which water, the vinyl chloride-based monomeric material, a polymerization initiator and a dispersant, together with other various additives as required, are placed into a polymerization vessel equipped with a jacket and a reflux condenser, and cooling water is passed through the jacket and reflux condenser to remove the heat of polymerization, thereby controlling the temperature of the reaction system to a predetermined temperature.

In order to enhance productivity of the polymerization vessel in practicing the conventional process, it is necessary to increase the amount of the vinyl chloride-based monomeric material placed into the polymerization vessel or to shorten the polymerization time. In any of the cases, the heat of reaction per unit time is increased. Consequently, cooling capability of the polymerization apparatus used would come to be an issue. Conventionally, various methods have been adopted for coping with this problem, for example, a method by lowering the temperature of the cooling water passed through the jacket to achieve more powerful cooling, or a method by increasing the quantity of heat removed by the reflux condenser.

However, the former method is expensive and therefore unadvantageous economically, and the latter method has the drawback that carry-over arises from foaming of the polymerization reaction mixture, leading to polymer scale formation, or the number of fish-eyes in the resulting polymer product is increased.

On the other hand, continuous polymerization process is advantageous from a productivity point of view. In the case of vinyl chloride polymers, however, no continuous polymerization process has been successfully put to practical use, because of difficulties as to product quality (especially, fish-eye), polymer scale deposition and the like.

SUMMARY OF THE INVENTION

It is accordingly an object of the present invention to provide an apparatus by which a vinyl chloride-based polymer having high quality with few fish-eyes can be produced using a continuous polymerization process with a high productivity, while preventing the deposition of polymer scale.

According to the present invention, there is provided an apparatus for continuous polymerization of vinyl chloride or a vinyl chloride-based monomeric mixture, comprising at least one pre-mixer for preparing an aqueous suspension of the vinyl chloride or vinyl chloride-based monomeric mixture, and a polymer slurry tank connected to said pre-mixer through a polymerization passage, wherein a pump comprising a conical hub and an impeller mounted thereon comprised of a single spiral blade is used for drawing out the aqueous suspension from said pre-mixer into said polymerization passage and for discharging a polymer slurry formed in said passage into said slurry tank, and said polymerization passage has a length sufficient for permitting the vinyl chloride or vinyl chloride-based monomeric mixture contained in the aqueous suspension flowing through said passage to be polymerized to a predetermined extent while passing through said passage.

DETAILED DESCRIPTION OF THE INVENTION

The present invention has been attained based on the discovery that the construction of a pump used for feeding a polymer slurry under pressure has a significant effect on polymer scale formation. In normal suspension polymerization, droplets of monomer suspended and dispersed under a agitating operation and the action of a dispersant are repeatedly united and dispersed, thereby gradually forming a polymer resin. Upon receiving high shearing forces exerted by the impeller of a volute pump or the like, the monomeric droplets are torn up into minute particles, so that the monomeric material containing an oil-soluble initiator comes into direct contact with the impeller and inner walls of piping, heat exchanger and the like, leading to a markedly increased deposition of polymer scale. As a result, there arise the problems that the polymer obtained has a broadened particle size distribution, the particle size is difficult to control, and the number of fish-eyes in the polymer is increased, making it impossible to obtain a polymer product with good quality.

According to the present invention, a pump comprising a conical hub and an impeller mounted thereon comprised of a single spiral blade is used as a pump in an apparatus for continuous polymerization, whereby dispersed droplets of a vinyl chloride-based monomeric material can be conveyed without suffering excessive breakage. According to the invention, therefore, polymer scale deposition in the polymerization system is greatly suppressed, making it possible to perform a continuous operation and to obtain a vinyl chloride-based polymer having good quality with few fish-eyes. Furthermore, because capability to remove heat is enhanced, a polymerization initiator having a higher activity can be used in a large amount, thereby realizing a shorter polymerization time.

Figure 1:
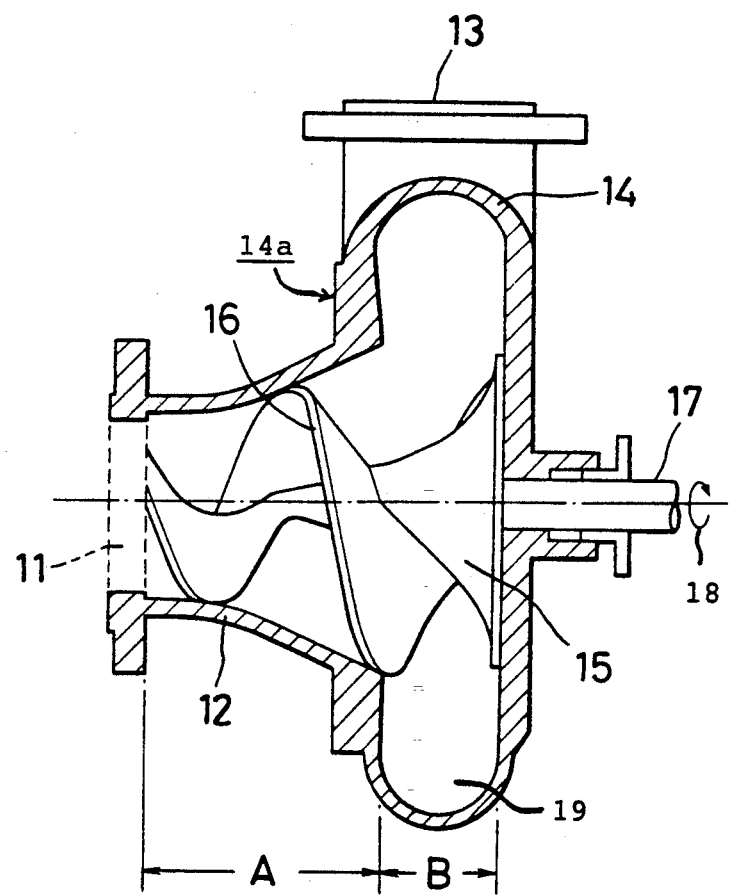
FIG. 1 is an illustration of the construction of a centrifugal pump used in the present invention.

An example of the pump to be used in the present invention is illustrated in FIG. 1.

The pump shown in FIG. 1 comprises a conical hub 15 disposed rotatably on a rotating shaft 17, and an impeller 16 comprises of a single spiral blade mounted on the hub 15. The diameter of the impeller 16 is small near the apex portion of the conical hub 15, and is gradually increased toward the base portion of the hub 15. A casing 14a enclosing the hub 15 and the impeller 16 has a thick, hollow disk-like shape at its nearly half portion 14 corresponding to a base portion of the hub 15, such that an annular space (volute chamber) 19 is formed around the hub 15. The casing 14a is shaped like a truncated cone at its nearly half portion 12 corresponding to an apex portion of the hub 15, with its inside surface being almost in contact with the outer edge of the spiral impeller 16. At the smaller end of the truncated conical casing portion 12 is provided a suction port 11 for an aqueous suspension mixture, and a piping is connected thereto. The disk-like casing portion 14 is provided in its side wall with a discharge port 13 for the aqueous suspension mixture, and a piping is connected thereto.

In the pump as above, the hub 15 and the impeller 16 are rotated in the direction of arrow 18. In a zone A corresponding to the truncated conical casing portion 12, the impeller 16 principally exerts a screw action on the aqueous suspension mixture. That is, in this zone, the impeller 16 with the screw-like shape acts in a manner similar to a positive displacement pump. In addition, with only one blade, the impeller 16 produces a gentle flow, and there is low possibility of cavitation being caused by centrifugal forces and shearing forces. Thus, the impeller 16 does not break polymer particles in the aqueous suspension mixture and, yet, exerts a strong suction force on the suspension mixture being introduced through the suction port 11. Besides, the impeller 16 disposed inside the truncated conical casing portion 12 is gradually increased in diameter toward the disk-like shaped casing 14. During the rotation of the impeller 16, therefore, the aqueous suspension mixture present near the outer peripheral edge of the blade of the impeller 16 is permitted to flow smoothly, while acquiring a gradually increasing flow velocity in the circumferential direction, resulting in an added discharging pressure.

In a zone B corresponding to the disk-like shaped casing portion 14, on the other hand, a centrifugal action is predominantly exerted on the aqueous suspension mixture; therefore, the aqueous suspension mixture, or polymerization reaction mixture, is discharged through the discharge port 13 at a high discharge pressure.

Pumps of this construction are commercially available generally under the trade name "Hydrostal Pump" (product by Taiheiyo Kinzoku K. K.).

The apparatus for continuous polymerization according to the present invention will now be described with reference to a specific embodiment as shown in the attached drawing.

Figure 2:
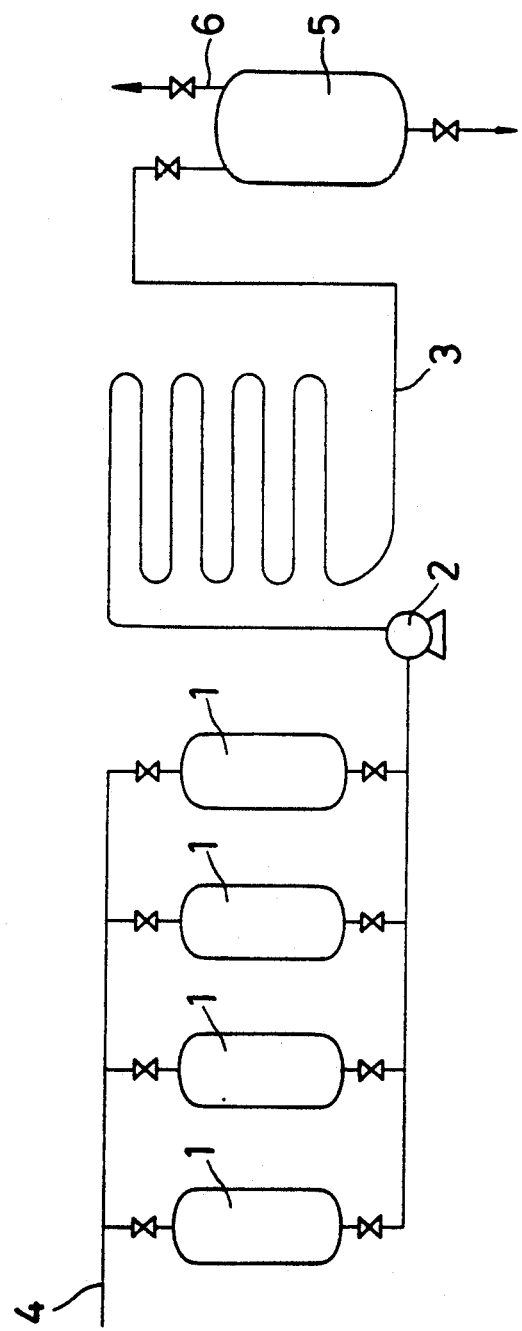
FIG. 2 is an illustration of the total construction of a polymerization apparatus according to the present invention.

FIG. 2 illustrates schematically the total arrangement of one embodiment of the polymerization apparatus according to the present invention. In the figure, there are shown a pre-mixer 1, a feed pump 2, a piping 3 constituting a polymerization passage, a starting-material feed piping 4, and a slurry tank 5 serving also for separation of unreacted monomeric material. Reference character 6 denotes a piping for recovery of unreacted monomeric material.

In the present polymerization apparatus, a monomeric material, an aqueous medium, a dispersant, an oil-soluble polymerization initiator and the like introduced into the pre-mixer 1 are mixed together uniformly, to form an aqueous suspension. The pre-mixer 1 may be of any form; for example, it may be an ordinary polymerization vessel equipped with agitating elements and a jacket for temperature control, or a tube-type mixer comprising a static mixer. The number of such pre-mixers is not particularly limited. For instance, a single pre-mixer may be used to construct an entirely continuous polymerization system, or, alternatively, a plurality of pre-mixers may be used to form a system in which the polymerization reaction mixture is reacted to a specified rate of polymerization, or degree of conversion, within the pre-mixers before being drawn out into the polymerization piping 3. The components of the aqueous suspension mixture, such as the monomeric material, aqueous medium, polymerization initiator, dispersant and the like, may be supplied individually through independent pipings or may be supplied through a common piping.

As the pump 2 in the present invention, a centrifugal pump of the construction shown in FIG. 1 is used, as has been described above. The centrifugal pump 2 raises the pressure of the aqueous suspension drawn out of the pre-mixer 1, and polymerization is permitted to proceed in the polymerization piping 3 arranged next to the pre-mixer 1. Subsequently, the flow of the aqueous suspension is a perfect piston flow.

In the apparatus according to the present invention, substantial polymerization is carried out in the polymerization piping 3. Therefore, in order to control the temperature of the aqueous suspension in the polymerization piping 3, it is preferable, for example, to form the piping 3 with a double-walled tube structure and to pass cooling water or brine through the outer passage or to arrange a heat exchanger (of a shell-and-plate type, coil type, spiral type or the like) at an intermediate position of the piping 3 so that cooling and heating can be performed suitably. Furthermore, if boosting is required, a pump of the same type as the pump 2 may be arranged as a booster at an intermediate position of the polymerization piping 3.

The length of the polymerization piping 3 is determined according to the polymerization time necessary for a predetermined polymerization degree to be attained in the aqueous suspension flowing through the piping 3. For example, where the linear velocity of the aqueous suspension is 0.7 m/sec and the polymerization time is 30 minutes, the length of the polymerization piping 3 is 1260 m.

The polymer slurry having had a dwell time for reaching a predetermined polymerization degree in the polymerization piping 3 is drawn out into the slurry tank 5, where unreacted monomers are removed, and the polymer slurry is fed successively to the subsequent dehydrating and drying steps.

In the present invention, the heat exchanger, pump, piping and the like which are contacted by the reaction mixture are preferably formed of stainless steel such as 18Cr-8Ni austenitic, 13Cr ferritic, martensitic, 18Cr ferritic, high-chromium ferritic, and two-phase austenitic-ferritic stainless steels, from the viewpoints of heat transfer and corrosion resistance. Besides, for preventing deposition of polymer scale, the inside surfaces of these parts are preferably specular-finished by buffing, electrolytic polishing or the like to have a surface roughness $R_{max}$ of 2 μm or below. Also, for the same purpose, a conventionally known polymer scale preventive agent may be applied to the inside surface of the parts, or may be added to the aqueous suspension.

Such polymer scale preventive agents include, for example, those described in Japanese Patent Publication (KOKOKU) Nos. 45-30343, 45-30835, 45-37988, 46-4753, 46-16084, 46-20821, 48-29795, 49-2992, 51-21672, 51-24953, 51-37306, 51-37308, 52-24070, 53-6023 through 6026, 53-21908, 53-28347, 53-28348, 53-36509, 53-46235, 55-4327, 55-5523, 56-5442 through 5444, 56-22445, 56-22447, 57-31730, 57-34286, 57-47922, 57-59243, 58-11884, 58-12893, 58-13564, 58-14444 through 14447, 59-1413, 59-31522, 59-34721, 60-6361, 60-40444, 60-42245, 60-48522, 60-48523, 60-59246, 60-59247, 61-842, 61-843, 61-21247, and 61-25730, Japanese Pre-examination Patent Publication (KOKAI) Nos. 51-50887, 53-108187, 54-50089, 54-101889, 55-21436, 55-54305, 55-54317, 55-73709, 55-98207, 55-112209, 55-155001, 55-155002, 56-112903, 57-192413, 57-192414, 57-105702, 57-198710, 58-8709, 58-11504, 58-61104, 58-69203, 58-101103, 58-103503, 58-168607, 58-180509 through 180511, 58-204006, 58-210902, 59-11303, 59-78210, 59-129207, 59-170102, 59-184202, 59-202201, 59-210902, 60-20909, 60-47002, 60-71601, 60-71614, 60-72902, 60-96603, 60-233103, 61-7309, 61-31406, 61-34006, 61-51001, and 61-51002.

Besides, polymer scale preventive agents which comprise (A) a nitrogen-containing organic compound having a series of five or more conjugated $\pi$ bonds, (B) an anionic organic compound having at least one sulfonic acid group or carboxyl group and a series of five or more conjugated $\pi$ bonds, and (C) a vinyl pyrrolidone-based polymer, can also be used.

Furthermore, in order to enhance the polymer scale preventive effect, a water-soluble inhibitor may be added to the aqueous suspension.

Water-soluble inhibitors which can be used for this purpose include, for example, nitrites such as sodium nitrite, potassium nitrite, ammonium nitrite, calcium nitrite, silver nitrite, strontium nitrite, cesium nitrite, barium nitrite, magnesium nitrite, lithium nitrite, dicyclohexylammonium nitrite and the like; thiocyanates such as ammonium thiocyanate, lead thiocyanate, sodium thiocyanate, potassium thiocyanate, aluminum thiocyanate and the like; and water-soluble sulfur-containing organic compounds, for example, hydroxyl-substituted mercaptans such as mercaptoethanol, monothiopropylene glycol and monothioglycerol, mercaptocarboxylic acids such as thioglycolic acid, thiohydroacrylic acid, thiolactic acid and thiomalic acid, amino-substituted mercaptans such as thioethanolamine, nitro-substituted mercaptans such as $\beta$-nitroethylmercaptan, hydroxyl-substituted dimercaptans such as 1,2-dithioglycerol and 1,3-dithioglycerol, dimercaptoketones such as 1,3-dimercaptoacetone, dimercaptocarboxylic acids such as $\beta,\beta'$-dithioisobutyric acid, hydroxyl-substituted sulfides such as thioglycol, sulfidocarboxylic acids such as thiodiglycolic acid, $\beta,\beta'$-thiodipropionic acid and thiodilactic acid, aldehyde-substituted sulfides such as $\beta$-methylthiopropionaldehyde, amino-substituted sulfides such as $\beta$-aminoethyl sulfide, nitro-substituted sulfides such as $\beta$-nitroethyl sulfide, mercapto-substituted sulfides such as $\beta$-mercaptoethyl sulfide, disulfides such as dithioglycolic acid, $\beta,\beta'$ dithiodipropionic acid, monoaminosulfonic acids such as methylaniline-3-sulfonic acid, sulfanilic acid, methylaniline-4-sulfonic acid and aniline-2,4-disulfonic acid, sulfur-containing amino acid hydrochlorides such as L-methionine hydrochloride, L-cystine hydrochloride and L-cysteine hydrochloride, sulfur derivatives of carbonic acid such as thiourea and sodium diethyldithiocarbamate, sulfur-containing organic compounds such as ammonium sulfamate, and so on. These can be used either singly or in combination of two or more.

In order to suppress the deposition and growth of polymer scale as well as the formation of fish-eyes, it is necessary that the aqueous suspension flowing through the polymerization piping should not stagnate. For this reason, the interior of the polymerization piping 3 and those portions of the heat exchanger, valves and the like used in combination with the piping 3 through which the aqueous suspension flows are designed and arranged in such a fashion that the aqueous suspension will not stagnate therein. Besides, it is preferable that the aqueous suspension flows at a linear velocity of 0.7 m/sec or above. If the linear velocity is less than 0.7 m/sec, deposition of polymer scale tends to be increased.

As the monomeric material to be subjected to polymerization in the polymerization apparatus of the present invention, not only vinyl chloride monomer but also mixtures of vinyl chloride (as a main constituent) and other vinyl monomer or monomers copolymerizable therewith (vinyl chloride content: 50% by weight or above) may be used. The comonomers to be copolymerized with vinyl chloride include, for example, vinyl esters such as vinyl acetate, vinyl propionate and the like; acrylic or methacrylic esters such as methyl acrylate, ethyl acrylate and the like; olefins such as ethylene, propylene and the like; maleic acid anhydride; acrylonitrile; styrene; vinylidene chloride, and the like.

Where a dispersant is used in the suspension polymerization, the kind of the dispersant is not particularly restricted, and those dispersants which are conventionally used can be used. The dispersants usable include, for example, water-soluble cellulose ethers such as methyl cellulose, hydroxyethyl cellulose, hydroxypropyl cellulose, hydroxypropyl methyl cellulose and the like; partially saponified polyvinyl alcohols; acrylic acid polymers; water-soluble polymers such as gelatin and the like; oil-soluble emulsifiers such as sorbitan monolaurate, sorbitan trioleate, glycerin tristearate, ethylene oxide propylene oxide block copolymers and the like; water-soluble emulsifiers such as polyoxyethylenesorbitan monolaurate, polyoxyethyleneglycerin oleate, sodium laurate, and the like. These may be used either singly or in combination of two or more.

As the polymerization initiator for the suspension polymerization, those initiators conventionally used for polymerization of vinyl chloride or vinyl chloride-based monomeric mixtures can be used. Examples of the usable initiators include percarbonate compounds such as diisopropyl peroxydicarbonate, di-2-ethylhexyl peroxydicarbonate, diethoxyethyl peroxydicarbonate and the like; per-ester compounds such as t-butyl peroxyneodecanate, t-butyl peroxypivalate, t-hexyl peroxypivalate, $\alpha$-cumyl peroxyneodecanate and the like; peroxides such as acetylcyclohexylsulfonyl peroxide, 2,4,4-trimethylpentyl 2-peroxyphenoxyacetate, 3,5,5-trimethylhexanoyl peroxide and the like; azo compounds such as azobis-2,4-dimethylvaleronitrile, azobis(4-methoxy-2,4-dimethylvaleronitrile) and the like; and, further, potassium persulfate, ammonium persulfate, hydrogen peroxide, and the like. These can be used either singly or in combination of two or more.

In carrying out suspension polymerization by use of the polymerization apparatus according to the present invention, the other polymerization conditions than the above, for example, the method of feeding the monomeric material, aqueous medium, dispersant and the like may be essentially the same as in the prior art. Also, such conditions as the proportions of these charges, polymerization temperature and the like may be essentially the same as in the prior art.

To the aqueous suspension for polymerization in the apparatus of the present invention, if necessary, polymerization regulator, chain transfer agent, pH adjustor, gelation improving agent, antistatic agent and the like conventionally used suitably for polymerization of vinyl chloride-based monomeric mixtures can be added as desired.

In general, the ratio of the amount of water supplied to the amount of the monomeric material supplied is preferably in the range from 0.6 to 4.0, by weight. It is also possible to add water at an intermediate position of the polymerization piping 3. Besides, the starting material, or monomeric material, polymerization initiator, dispersant, polymerization inhibitor and the like can be added at intermediate positions of the polymerization piping 3.

According to the present invention, deposition of polymer scale in pumps, heat exchangers and pipings can be markedly suppressed, and a resin with few fisheyes can be produced. Therefore, the suspension polymerization carried out in the polymerization apparatus of the present invention is of an extremely high industrial value as a continuous polymerization process. The present invention eliminates device restrictions on removal of heat, so that productivity can be markedly enhanced, as compared with batch-type polymerization according to the prior art.

EXAMPLES

Example 1

Polymerization Apparatus

Figure 3:
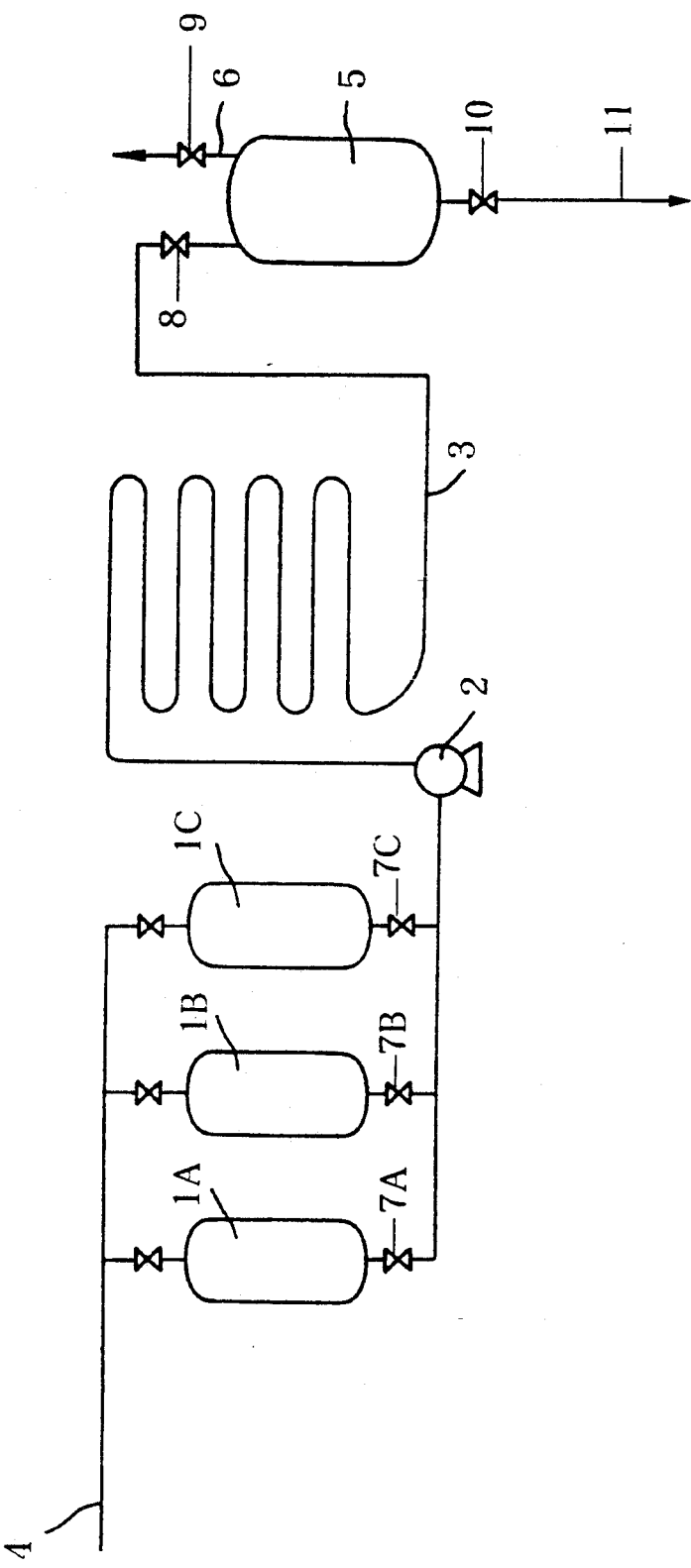
FIG. 3 is an illustration of a polymerization apparatus used in Example, which will be described below.

In this example, the polymerization apparatus as illustrated in FIG. 3 was used.

In the figure, reference characters 1A, 1B and 1C each denote a 2.1-$m^3$ stainless-steel polymerization vessel equipped with jacket and agitator.

Numeral 2 denotes a slurry feed pump, consisting essentially of a conical hub and an impeller mounted thereon comprised of a single spiral blade. The pump, a Hydrostal pump equipped with an inverter-type flow rate controller, has a pumping capability of 24 $m^3/hr \times 7.5$ m.

Numeral 3 denotes a polymerization passage consisting essentially of a piping, 3500 m in length. The polymerization piping 3 has a double-pipe construction in which a slurry is fed through the inner pipe to a slurry tank 5, while hot water or cooling water is passed through the passage between the inner and the outer pipe so as to control the temperature of the slurry flowing through the inner pipe. The inner pipe has an inside diameter of 25.4 mm.

The slurry tank 5, formed of stainless steel, has an internal volume of 5 $m^3$ and is equipped with a jacket and an agitator. The slurry tank 5 is fitted with a capacitance-type level sensor, at a level corresponding to an internal volume of 3 $m^3$ as measured from the bottom of the tank. The level sensor detects the condition where the amount of slurry accumulated in the tank 5 has just reached 3 $m^3$.

Numeral 4 denotes a piping for feeding starting materials for polymerization. Denoted by 6 is a piping for recovery of vinyl chloride monomer, and numeral 11 denotes a piping for feeding the slurry to a centrifugal dehydrator (not shown in FIG. 3).

Application of Polymer Scale Preventive Agent

Before carrying out polymerization by using the polymerization apparatus as shown in FIG. 3, a polymer scale preventive coating solution was applied to the inside wall surfaces of the polymerization vessels 1A, 1B and 1C, the inner pipe of the polymerization piping 3 and the slurry tank 5 and to the interior of the pump 2, followed by air drying at normal temperature and washing with water. The polymer scale preventive coating solution was a methanol solution containing Sudan Black B, Acid Black 2 and polyvinyl pyrrolidone (average molecular weight: 40,000) in a total concentration of 0.2% by weight, with the weight ratio of (Sudan Black B) / (Acid Black 2) / (polyvinyl pyrrolidone) being 40/40/20.

Preparation For Starting Polymerization Procedures

Prior to the polymerization procedures as described below, the inner pipe of the polymerization piping 3 was filled up with deionized water. Then hot water was passed through the passage between the inner and the outer pipe of the polymerization piping 3, whereby the temperature inside the inner pipe was maintained at 54.5° C.

Polymerization Procedures

Procedure 1

The polymerization vessel 1A was charged with 860 kg of deionized water, 3200 g of a 10 wt.% aqueous solution of partially saponified polyvinyl alcohol, and 2130 g of a 10 wt.% aqueous solution of cellulose ester, with agitating. After degassing to lower the pressure inside the polymerization vessel 1A to 50 mmHg, 711 kg of vinyl chloride monomer was charged into the vessel 1A with agitating. It took about 40 minutes to complete Procedure 1.

Procedure 2

After Procedure 1 was over, 768 g of a 50 wt.% solution of α,α-bis-neodecanoylperoxydiisopropylbenzene in isoparaffin and 3072 g of a 50 wt.% solution of t-butyl peroxyneodecanate in isoparaffin were pumped into the polymerization vessel 1A, with agitating. A period of about 10 minutes was needed to pump the polymerization initiator into the vessel 1A.

Simultaneously with the start of feeding the polymerization initiator by the pump, hot water was started passing through the jacket for the polymerization vessel 1A to raise temperature, thereby starting polymerization. After the temperature of the polymerization reaction mixture in the vessel 1A was raised to 54.5° C., polymerization was continued by maintaining that temperature. Polymerization was carried out over a period of 1 hour and 10 minutes from the start of temperature rise. At the end of this period, the rate of polymerization (or degree of conversion) was about 30%

It took 1 hour and 10 minutes to complete Procedure 2.

Procedure 3

After Procedure 2 was finished, valves 7A and 8 were opened and, simultaneously, the pump 2 was started operating to convey the slurry from the polymerization vessel 1A into the slurry tank 5 through the polymerization piping 3 at a rate of 0.73 m/sec. During the conveying of slurry, cooling water was passed through the passage between the inner and the outer pipe of the polymerization piping 3, thereby maintaining the slurry being conveyed at the polymerization temperature.

A period of 80 minutes was necessary for the slurry in the polymerization vessel 1A to be completely removed from the vessel 1A.

Procedure 4

Simultaneously when the transfer of the slurry from the polymerization vessel 1A is started, the agitator provided for the slurry tank 5 is operated, so that the slurry is conveyed through the polymerization piping 3 into the slurry tank 5 under agitation. The pressure inside the slurry tank 5 is maintained at or below 6.5 kg/cm$^2$G. Where the internal pressure exceeds 6.5 kg/cm$^2$G, a valve 9 is opened to recover unreacted vinyl chloride monomer from the slurry tank 5 via the piping 6.

Procedure 5

When Procedure 1 for the polymerization vessel 1A is finished and Procedure 2 is started, Procedure 1 for the polymerization vessel 1B is started. That is, vinyl chloride monomer is charged into the polymerization vessel 1B and kept under agitation. After 10 minutes from the start of Procedure 3 for the polymerization vessel 1A (transfer of the slurry from the vessel 1A to the slurry tank 5), Procedure 2 for the polymerization vessel 1B is started.

Procedure 6

When the polymerization vessel 1A is emptied of the slurry and Procedure 3 for the vessel 1A is finished, the valve 7A is closed and a valve 7B is opened, thereby starting Procedure 3 for the polymerization vessel 1B and transfer of slurry from the vessel 1B to the slurry tank 5.

Procedure 7

When Procedure 1 for the polymerization vessel 1B is finished and Procedure 2 for the vessel 1B is started, Procedure 1 for the polymerization vessel 1C is started. That is, vinyl chloride monomer is charged into the polymerization vessel 1C and kept under agitation. After 10 minutes from the start of Procedure 3 for the polymerization vessel 1B (transfer of the slurry from the vessel 1B to the slurry tank 5), Procedure 2 for the polymerization vessel 1C is started.

Procedure 8

When the polymerization vessel 1B is emptied of the slurry and Procedure 3 for the vessel 1B is finished, the valve 7B is closed and a valve 7C is opened, thereby starting Procedure 3 for the polymerization vessel 1C (transfer of slurry from the vessel 1C to the slurry tank 5).

Procedure 9

When Procedure 1 for the polymerization vessel 1C is finished and Procedure 2 for the vessel 1C is started, Procedure 1 for the polymerization vessel 1A is started. That is, vinyl chloride monomer is charged into the polymerization vessel 1A and kept under agitation. After 10 minutes from the start of Procedure 3 for the polymerization vessel 1C (transfer of slurry from the vessel 1C to the slurry tank 5), Procedure 2 for the polymerization vessel 1A is again started.

Procedure 10

When polymerization vessel 1C is emptied of the slurry and Procedure 3 for the vessel 1C is finished, the valve 7C is closed and the valve 7A is opened, thereby starting again Procedure 3 for the polymerization vessel 1A (transfer of slurry from the vessel 1A to the slurry tank 5).

Procedure 11

When Procedure 1 for the polymerization vessel 1A is finished and Procedure 2 for the vessel 1A is started, the polymerization vessel 1B is charged with 1800 kg of deionized water. After the charging, hot water is started flowing through the jacket for the polymerization vessel 1B to raise temperature inside the vessel 1B. After the temperature is raised to 54.5° C., the temperature is maintained. When the polymerization vessel 1A is emptied of the slurry and Procedure 3 for the vessel 1A is finished, the vale 7A is closed and the valve 7B is opened, thereby starting transfer of the deionized water from the polymerization vessel 1B to the slurry tank 5. After 80 minutes from the start of the transfer, the operation of the pump 2 is stopped and the valve 8 is closed, thereby stopping the transfer.

Procedure 12

By the above Procedures 1 to 11, slurry is continuously transferred into the slurry tank 5 from the polymerization vessels 1A, 1B and 1C, which are cyclically operated in that order. When the amount of slurry accumulated in the slurry tank 5 reaches 3 m$^3$, the condition is detected by the level sensor. In response to the detection by the level sensor, a valve 10 is opened and the slurry in the tank 5 is continuously fed to a centrifugal dehydrator at a rate of 1.33 m$^3$/hr.

The dehydrator continuously treats the slurry fed thereto. Polymer cakes obtained by the dehydration treatment are fed continuously to a fluidized-bed dryer, which continuously treats the polymer cakes. In this manner, a polyvinyl chloride was obtained.

EXPERIMENTS

After the polymerization Procedures were over, the inside wall of the inner pipe of the polymerization piping 3 and the interior of the pump were subjected to visual observation to check for deposition of polymer scale. The results are set forth in Table 1.

For the polyvinyl chloride obtained as above, bulk specific gravity, particle size distribution, plasticizer absorption, and fish-eye quality were measured according to the methods described below. The results are given in Table 1.

Bulk specific gravity

Measured according to JIS K 6721.

Particle size distribution

Using 60-, 100-, 150- and 200-mesh sieves according to JIS Z 8801, the polymer particles were sifted, and the amount of polymer particles (% by weight) having passed through each sieve was measured.

Plasticizer absorption

Glass fibers were packed in the bottom of an aluminum alloy vessel 25 mm in inside diameter and 85 mm in depth, and a 10 g sample of polyvinyl chloride was placed into the vessel. Then, 15 cc of dioctyl phthalate (DOP) was added, and left to stand for 30 minutes so that the DOP permeated the polymer sufficiently. Excess portion of the DOP was centrifugally removed under an acceleration of 1500 G, and the amount of DOP absorbed in the 10 g sample of the polymer was measured. From the measured value, DOP absorption per 100 g of the polymer was calculated.

Fish-eye

Twenty-five (25) g of a mixture prepared by mixing 100 parts by weight of the vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded by 6-inch kneading rolls at 140° C. for 5 minutes, and formed into a sheet 15 cm in width and 0.2 mm in thickness. For the sheet thus obtained, the number of transparent particles per 100 cm$^2$ area was counted. The count thus obtained was used as the number of fish-eyes.

COMPARATIVE EXAMPLE 1

A polyvinyl chloride was prepared by carrying out polymerization in the same manner as in Example 1, except that the feed pump 2 used in Example 1 was replaced by a volute pump having a pumping capability of 15 m$^3$/hr×15 m. Further, observation to check for polymer scale deposition and measurements of physical properties of the polyvinyl chloride (PVC) were carried out, also in the same manner as in Example 1. The results are given in Table 1.

TABLE 1

|  | Example 1 | Comparative Example 1 |
|---|---|---|
| Quality of Polymer: |  |  |
| Bulk specific gravity | 0.525 | 0.519 |
| Particle size distribution |  |  |
| (pass (wt.%)) 60 mesh | 100 | 87.6 |
| 100 mesh | 35.6 | 67.3 |
| 150 mesh | 5.6 | 26.4 |
| 200 mesh | 0.8 | 5.2 |
| Plasticizer absorption | 19.0 | 18.3 |
| Fish-eye | 15 | 1000 or above |
| Deposition of polymer scale | Not any scale deposition. | Deposition of large amounts of scale inside the pipings and pump. |

We claim:

1. An apparatus for continuous polymerization of vinyl chloride or a vinyl chloride-based monomeric mixture, comprising at least one pre-mixer for preparing an aqueous suspension of the vinyl chloride or vinyl chloride-based monomeric mixture, and a polymer slurry tank connected to said pre-mixer through a polymerization passage, wherein a pump comprising a conical hub and an impeller mounted thereon comprised of a single spiral blade is used for drawing out the aqueous suspension from said pre-mixer into said polymerization passage and for discharging a polymer slurry formed in said passage into said slurry tank, and said polymerization passage has a length sufficient for permitting the vinyl chloride or vinyl chloride-based monomeric mixture contained in the aqueous suspension flowing through said passage to be polymerized to a predetermined extent while passing through said passage.

2. The apparatus according to claim 1, wherein the linear velocity of the aqueous suspension in said polymerization passage is set at a value of 0.7 m/sec or above.

3. The apparatus according to claim 1, which comprises more than one said pre-mixer.

* * * * *